May 5, 1959 L. C. PEARCE 2,884,820
DRILLING JIG STRUCTURE
Filed Sept. 23, 1957 2 Sheets-Sheet 1

INVENTOR.
LEWIS C. PEARCE
BY

May 5, 1959     L. C. PEARCE     2,884,820
DRILLING JIG STRUCTURE
Filed Sept. 23, 1957     2 Sheets-Sheet 2

INVENTOR.
LEWIS C. PEARCE
BY

United States Patent Office —

2,884,820
Patented May 5, 1959

2,884,820

DRILLING JIG STRUCTURE

Lewis C. Pearce, Berea, Ohio, assignor to Pearce Development Company, a corporation of Ohio Application September 23, 1957, Serial No. 685,443

2 Claims. (Cl. 77—62)

My invention relates to jigs, particularly a jig assembly for guiding drilling operations.

An object of my invention is to provide a unique assembly of parts arranged for providing guidance to a drill used in drilling a workpiece.

Another object is the provision for a structure arranged to have interchangeable parts and arrangements to provide a desired jig function for the drilling of a workpiece.

Another object is the provision of a drilling jig structure so fabricated as to accommodate itself to different needs and requirements.

Another object is to provide flexibility and ready modification in the structure of a jig.

Another object is the provision of a jig structure having parts so arranged as to provide for ready combination of jig structures in desired arrangements.

Another object is the provision of a jig structure which provides both economy and efficiency in meeting the requirements for guidance of drilling operations.

Another object is the provision of a construction in a jig so arranged that different jigs may be combined in various ways to meet the requirements of an operation.

Other objects and a fuller understanding of my invention may be had by referring to the following description and claims, taken in conjunction with the accompanying drawing, in which:

Figure 2:
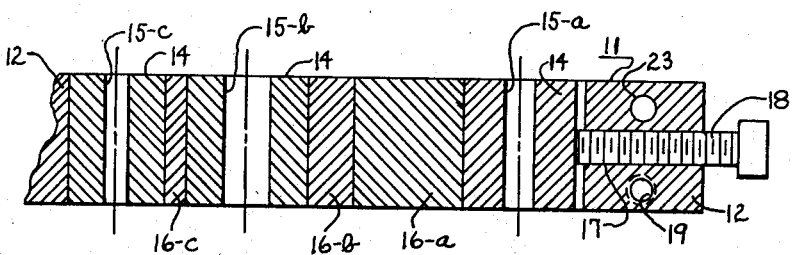
Figure 2 is a longitudinal sectional view taken along a longitudinal plane through my jig structure in the direction of the arrows 2—2 of Figure 1.
Figure 1:
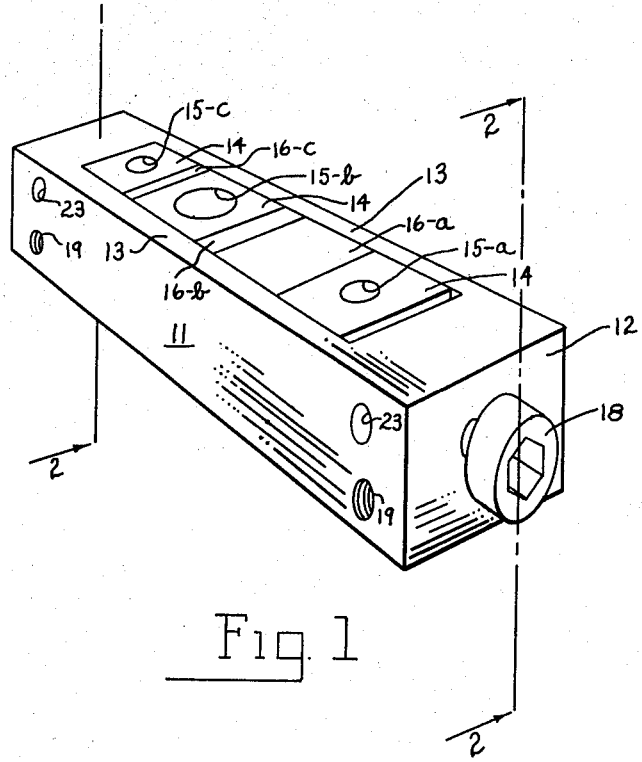
Figure 1 is a perspective view of a jig structure embodying my invention.

My jig structure has a frame denoted generally by the reference character 11, preferably made of steel or other suitable metal. The frame 11 is a four-sided structure having two opposite end walls 12 joined by two opposite side walls 13. The walls 12 and 13 thus provide a rectangular open space surrounded by these walls and open at the top and bottom.

This frame 11 has fixed dimension and is adapted to be secured in position over a workpiece upon which drilling operations are to be performed. Positioned within the open space within the frame 11 are a plurality of blocks. Certain of these blocks are apertured blocks and are designated by the reference character 14. Others of these blocks are spacer blocks, preferably solid, and designated by the reference character 16. The apertured blocks are provided with openings extending therethrough from one end to another, the axes of these openings being disposed parallel to each other and along the length of the assembly.

The openings in the apertured blocks may be of desired diameter to meet certain size drills to be used in drilling a workpiece. For example, in the drawing I show an apertured block 14 having an opening of one diameter designated as opening 15–a, another apertured block 14 having an opening of another diameter and designated as opening 15–b, and another apertured block 14 having an opening of still another diameter and designated as opening 15–c. These apertured blocks are hardened steel so that the drill extending through the respective openings is properly guided into the workpiece at the desired location without cutting the side of the opening in the apertured block. The openings are identified as drilling openings 15 with the variations in size being denoted by the lower case letter added to the reference character 15.

Any desired assembly of apertured blocks and spacer blocks may be positioned within the frame 11 in such manner as to locate the openings 15 at the proper location with reference to a workpiece to be drilled. In order to space the openings 15 properly apart, the spacer blocks 16 may be inserted intermediate the apertured blocks. The spacer blocks 16 have different thicknesses, that is, their longitudinal extent along the frame 11 varies. In the drawing, the reference character 16–a indicates a spacer block of one size, the reference character 16–b indicates a spacer block of another size and the reference character 16–c indicates a spacer block of another size. Other spacer blocks of required dimension may be added or substituted in order to get the axes of the openings spaced apart the required amount within the frame 11. In general, there are enough apertured blocks and spacer blocks positioned in the frame 11 to almost fill the opening therein.

To lock the spacer blocks and apertured blocks in the position shown in the drawing, there is provided in one end wall 12 a threaded opening 17 disposed axially of the frame 11. Preferably there is a threaded opening 17 in both end walls 12, the threaded openings 17 being in axial alignment with each other. The threaded bolt 18 is threadably engaged in each threaded opening 17 in such manner that the inner end of the bolt 18 extends inwardly into the opening in the frame 11 and abuts against the block next adjacent to the bolt 18. It is noted that the several blocks 14 and 16 are arranged in a column or sequential order. Longitudinal pressure imparted to the end block by the bolt 18 being threadably turned to press against the end block forces all the blocks against the opposite end wall. The pressure of the threaded bolt 18 against the column of blocks is such as to firmly lock the column of blocks in position within the frame and in the position shown in the drawings. Thus, the blocks are all held in proper position and with the axes of the openings 15 all at the proper location. The assembly of the frame 11 with the blocks 14 and 16 locked thereto is clamped or otherwise held in position over a workpiece, such as a piece of steel, to be drilled. The several openings 15 provide a guidance for a drill to drill the workpiece at the proper location.

Adjacent each of the opposite ends of the frame 11 is a transverse threaded opening 19. As shown in the drawings, these openings 19 extend transversely of the frame from one side to the other below the level of opening 17. The location of each opening 19 is such that it does not interfere with the longitudinal opening 17 through the respective end wall 12. Parallel to, and above, each opening 19 is an opening 23 extending through the frame 11 for accommodating aligning rods that may be used for holding joined frames in proper position relative to each other.

The transverse openings 19 are provided for the assembly and connecting of like assemblies together. For example, in Figure 3, two of the frames 11 with blocks 14 and 16 locked therein by bolts 18, are held in such side-by-side relationship by threaded bolts 20 in transverse openings 19. A bolt 20 may be inserted in an opening 19 at the opposite ends of the respective frames so as to securely hold the frames together.

Figure 4:
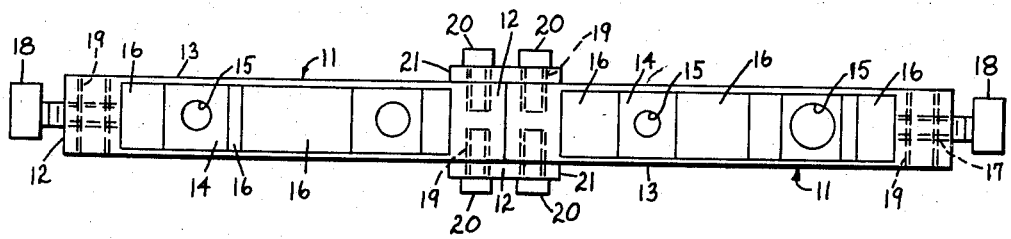
Figure 4 illustrates two of my jig structures secured together end to end to meet another requirement of an operation.
Figure 5:
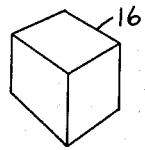
Figure 5 is a perspective view illustrating a spacer block used in my jig structure.
Figure 6:
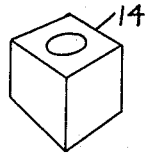
Figure 6 is a perspective view of a bushing block utilized in my jig structure.

The jig assemblies may also be secured in an end-to-end manner as illustrated in Figure 4. Here plates 21 are lapped alongside the adjacent ends of the two frames 11 and these plates 21 are bolted to the abutted frames by the threaded bolts 20. In this manner, the two assemblies may be securely held together by the plates 21 and bolts 20 threadably inserted in the adjacent threaded openings 19.

Figure 3:
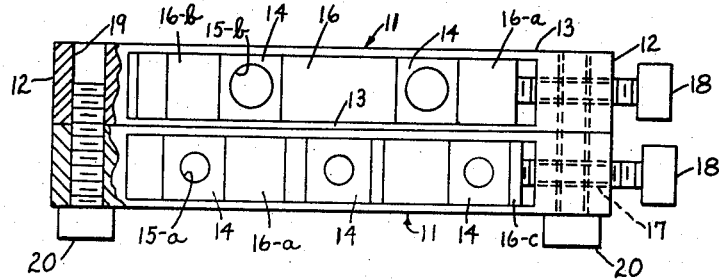
Figure 3 shows the assembly of two of my jig structures secured together in side-by-side relationship to meet the requirements of an operation.
Figure 7:
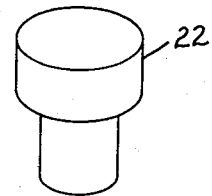
Figure 7 is a perspective view of a centering pin used for aligning my jig structure in relationship to a reference hole or recess.

Whether one assembly, or two side-by-side assemblies as in Figure 3, or two end-to-end assemblies as in Figure 4, are utilized, the jig assemblies are clamped or otherwise held in position over a workpiece so as to provide proper guidance for drills at the desired location in the workpiece. As an aid to properly locating the jig assemblies in relationship to a reference opening, a centering pin, such as the pin 22 shown in Figure 7, may be utilized. By properly aligning one of the openings 15 with a reference opening, the other openings 15 of the jig structure or assembly of jig structures may be properly located.

My device provides for desirable uses and for flexibility in jigging operations. It is economical in that a completely new jig need not be fabricated for each drilling operation, but rather the parts may be selected and assembled to obtain the location of drill guiding openings at locations desired for a certain drilling operation.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A drilling jig comprising in combination an assembly of blocks arranged in a column, some of said blocks being apertured for guiding a drill and others of said blocks being positioned to space the apertured blocks along said column, a four-sided frame member embracing said column of blocks, said frame member having side walls holding the blocks in alignment and having end walls in alignment with said column, said side walls and end walls defining a rectangular opening extending through the frame member from top to bottom, one of said end walls having a threaded opening extending therethrough in axial alignment with said column, said frame member adjacent said end walls having threaded bores extending therethrough, the axes of said bores being normal to said side walls and to said rectangular opening, said bores being adapted to accommodate bolts for securing together like frame members in side-by-side relationship with respective rectangular openings thereof disposed parallel to each other, and a threaded bolt threadably engaged in the said threaded opening and extending therethrough to abut the column of blocks and to lock the same in said frame member.

2. A jig for guiding drilling operations at desired locations comprising in combination a frame member defining on four sides a rectangular open space, said frame member having opposed end walls and opposed side walls joining said end walls, a plurality of blocks adapted to engage and extend between said side walls and to extend from the longitudinal opposed inner surfaces thereof to substantially fill the cross-sectional area of said open space between said side walls, some of said blocks being apertured blocks for guiding a drill in said drilling operation, other of said blocks being spacer blocks dimensioned to space said apertured blocks along the frame member at desired locations, said apertured blocks and spacer blocks being aligned in a column in said frame member intermediate said end walls, said frame member having holes extending therethrough in planes parallel to said end walls and normal to the plane of said opposed inner surfaces of said side walls, said holes being adapted to accommodate bolts for securing like frame members together in side-by-side relationship with the respective rectangular open spaces thereof in parallel relationship, and a threaded member threadably engaged to a said end wall and in axial alignment with said column of blocks, said threaded member being adapted to abut and press said column of blocks against the opposite end wall to lock the same in said frame member.

References Cited in the file of this patent
UNITED STATES PATENTS

| | | |
|---|---|---|
| 1,293,009 | Blaustein | Feb. 4, 1919 |
| 1,335,347 | Moulds | Mar. 30, 1920 |
| 2,643,563 | Gaudreau | June 30, 1953 |
| 2,710,454 | Kershaw | June 14, 1955 |